COMPUTER

Filed Dec. 9, 1964 2 Sheets-Sheet 1

INVENTOR.
LOUIS A. WARNER
BY Dominik and Stein
ATTORNEYS

COMPUTER
Filed Dec. 9, 1964 2 Sheets-Sheet 2
58 60 72 74 74
FIG. 3
84 60 58
88 88 86
FIG. 4
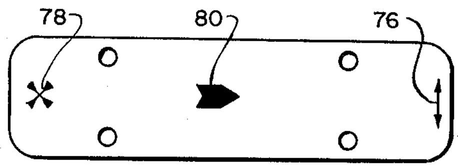
FIG. 5
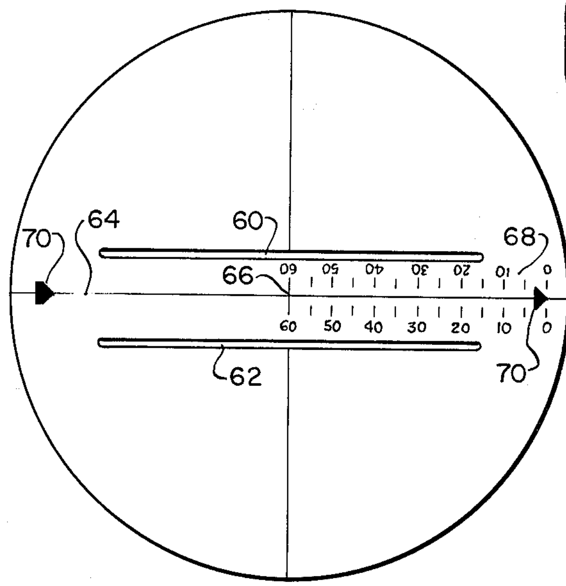
FIG. 6
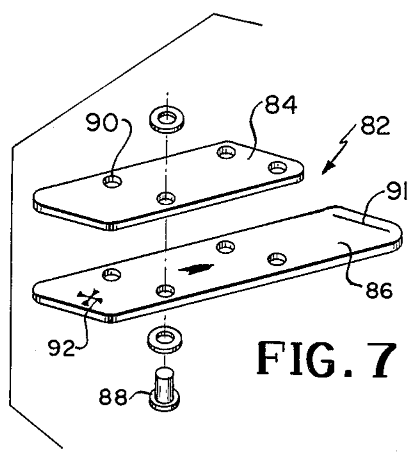
FIG. 7
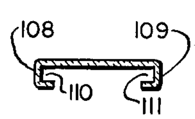
FIG. 9
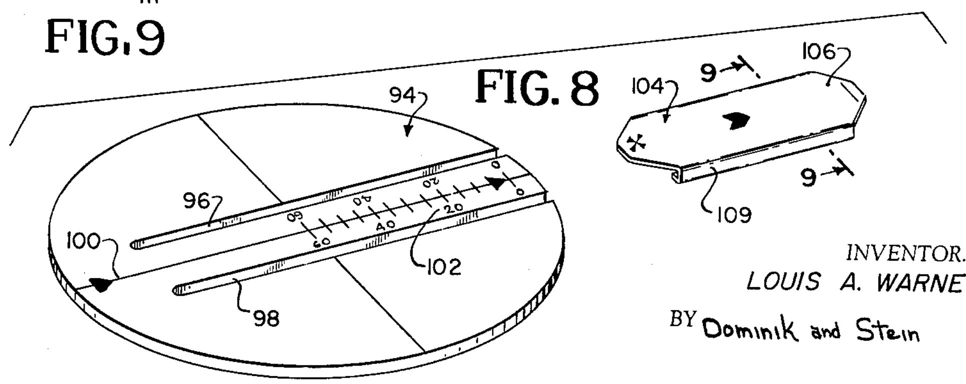
FIG. 8
104 106 9 9 109
INVENTOR.
LOUIS A. WARNER
BY Dominik and Stein
ATTORNEYS United States Patent Office 3,231,188 Patented Jan. 25, 1966

3,231,188

COMPUTER

Louis A. Warner, 5223 Natoma Ave. N., Chicago, Ill.

Filed Dec. 9, 1964, Ser. No. 417,175
7 Claims. (Cl. 235—61)

The present invention relates to a computing device and more particularly it relates to an improved computer for solving navigation problems.

In moderate speed aircraft aerial dead reckoning is the most common method of navigation used to direct an aircraft from one position to another. In aerial dead reckoning there are six basic variables that the navigator is continually concerned with, viz.: true airspeed which is the relative speed of an aircraft through a body of air; true heading which is the direction in which the aircraft is pointed; wind speed; wind direction; ground speed which is the speed of the aircraft with relation to the ground; and true course which is the path the aircraft travels over the ground. The navigator of an aircraft has the job of pairing the six above noted quantities into appropriate vectors which are then added together to form the wind triangle which is the very heart of the dead reckoning method of aerial navigation.

The most frequently encountered problem in aerial dead reckoning is that in which the True Course, the wind direction and speed, and the aircraft's speed are known. By the graphic solution of the wind vector problem the pilot-navigator can determine what heading to fly to offset the effect of the wind drifting tendency, and what the ground speed will be. The solution of this problem is basic to all pre-flight planning, providing requisite information for the filing of flight plans and the calculation of fuel consumption requirements. In flight, the periodic revision of heading and ground speed information with changing wind conditions enables the pilot to reduce the amount of deviation from the desired course, and to correctly amend the estimates of arrival times over intermediate points or at the destination.

Another application of the graphic solution of the wind vector problem occurs when the true heading and true airspeed are known to the navigator from his instruments, i.e., the compass reading (corrected for deviation and variation) will indicate the true heading, and the airspeed indicator (corrected for altitude and temperature) will give the true airspeed. The wind direction and speed must be obtained from weather bulletins preceding and during flight since wind conditions are constantly varying. From the above given data, which as indicated must be corrected for ambient conditions, the navigator can then solve the wind triangle and get his ground speed and true course.

The ground speed combined with the time of flight will determine the distance flown, and the direction and distance values so determined can be utilized to plot a D.R. (dead reckoning) position on the chart.

In another application of wind vector solutions, where a fix is obtained either by radio or visual observation the True Course and Ground speed can be obtained, and from instruments within the aircraft the True Heading and Air Speed can be determined. Thus, two sides of the wind triangle are known and the third side representing the actual wind direction and speed at flight level can be computed graphically.

There are many different types of computers known that are adaptable to the solution of the various problems indicated above. All computers are directed to serve the same fundamental purpose, i.e., rapid solution of dead reckoning mathematics with the minimum attention of the navigator to the solution of the various problems.

The mathematics involved in the solution of these navigational problems is not very difficult but it is endless. The navigator must constantly be aware of how far he has traveled, in what direction the aircraft is now flying, how fast he presently is traveling (with relation to the ground), how many minutes have elapsed since his last position check, what the wind conditions are and what effect they are having upon the course and speed of the aircraft, and many other aspects of navigation. As many as 150 separate computations may be required during one flight of about 4 hours duration in order to navigate the aircraft most effectively and accurately.

Most moderate speed aircraft flown today are in private or corporate service. A great many of these aircraft are flown by one person and it usually is the case that either that person is alone in the aircraft and of necessity must perform all navigational computations while flying the craft or he is the only person qualified to fly the aircraft, if more than one person is aboard, and similarly must solve navigational problems while flying the craft.

Thus, with only one qualified pilot-navigator within the aircraft, in most instances, it becomes rather important that the pilot be able to make all computations with one hand, leaving the other hand free to control and guide the aircraft. Most smaller aircraft are not equipped with automatic pilot controls to guide the plane along a predetermined course and therefore the pilot must pay strict attention to flight problems and conditions for the entire duration of the flight.

Since the pilot is required to divide his attention between piloting the aircraft and making his navigational computations it is important to assist the pilot in any manner possible in the design of a convenient computer.

An aircraft computing device, to be suitable for effective use in moderate speed aircraft must be designed such that computations may be performed with a minimum amount of effort and with reasonable simplicity. It, further, is of considerable advantage to combine into one instrument as many devices necessary to the solution of aerial navigation problems as is conveniently and reasonably feasible, without unduly complicating the device and without the sacrifice of simplicity of any of the separate computations to be performed on the computer.

In U.S. Patent 3,131,858 there is shown an aerial navigational computer which meets each of these qualifications and which therefore is particularly suited to solving wind triangle navigational problems. The computer therein disclosed has a cursor and a slide operable in conjunction with the cursor, in a manner such that rapid, accurate solutions of basic aerial dead reckoning navigational problems can be provided. The aerial navigational computer of the present invention is of the same type as that disclosed in the aforesaid patent and is therefore likewise particularly suited to solving wind triangle navigational problems. In addition, the aerial navigational computer of the present invention has an improved cursor and slider assembly so that in addition to providing each of the many advantages of the computer of the aforesaid patent provides a cursor and slider assembly which is more easily operated and is less susceptible to damage or breakage.

A primary object of the present invention is to provide an improved navigation computer which may be easily operated to correlate the variables necessary to the solution of navigational problems to permit navigation of an aircraft by dead reckoning.

It is a further object of the present invention to provide an improved navigation computer that is simply and inexpensively manufactured, durable in construction and easy to operate.

An adidtional object of the present invention is the provision of an improved navigation computer that may be operated with one hand to solve all navigational problems.

It is a further object of the present invention to provide an improved navigation computer that is suitable for rapid and accurate correlation of the true course, true airspeed, wind speed and wind direction to obtain accurate graphical representation of the ground speed and true heading of the aircraft for effective navigation of an aircraft.

An additional object of the present invention is to provide an improved navigation computer having an improved cursor and slide assembly operable to provide rapid and accurate graphical representation of the wind speed and direction without the use of a separate marking device, thereby facilitating one-hand operation of the computer. In this connection, it is a further object to provide a cursor and slide assembly which is less susceptible to damage or breakage.

Other objects of the invention will in part be obvious and will in part appear hereinafter.

The invention according comprises the features of construction, combination of elements, and arrangement of parts which will be exemplified in the constructoin hereinafter set forth, and the scope of the invention will be indicated in the claims.

For a fuller understanding of the nature and objects of the invention, reference should be had to the following detailed description taken in connection with the accompanying drawings, in which:

FIGURE 3 is a sectional view taken along line 3—3, in FIG. 1, illustrating a cursor and slide assembly exemplary of a first embodiment of the invention;

FIGURE 4 is a sectional view taken along line 3—3, in FIG. 1, illustrating a cursor and slide assembly exemplary of a second embodiment of the invention;

FIGURE 5 is a plan view of the slider of FIG. 3;

FIGURE 6 is a plan view of a disc cursor constructed in accordance with a first embodiment of the invention;

FIGURE 7 is an exploded perspective view of the slider assembly, of FIG. 4;

FIGURE 8 is a perspective view of a cursor and slider assembly constructed in accordance with still another embodiment of the invention; and FIGURE 9 is a sectional view of the slider, taken along line 9—9 in FIG. 8.

Figures 1, 2:
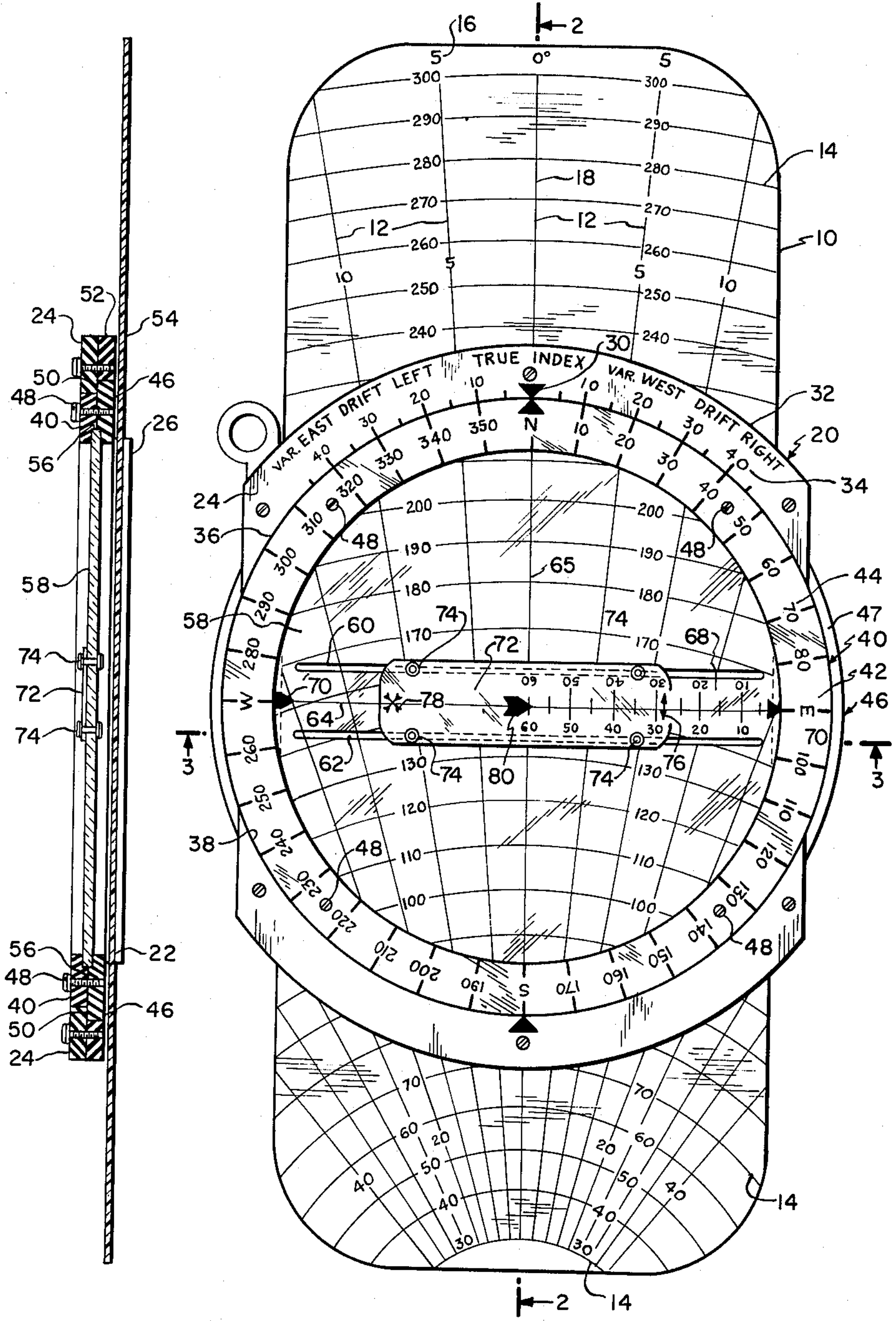
FIGURE 1 is a plan view of the slide member and top member in assembled relation.
FIGURE 2 is a sectional view taken along line 2—2, in FIGURE 1.

Referring more particularly now to FIGURES 1 and 2 of the drawings there is illustrated a specific embodiment of the present invention. An elongated, rectangular slide member 10 has provided on the surface thereof a plurality of radial lines and arcs, 12 and 14, respectively. The slide member 10 may be of a suitable rigid plastic material or of metal having the lines 12 and the arcs 14 indelibly impressed therein in a permanent fashion.

The radial lines 12 are identified by numerals 16, from 0° to 40° for the purposes of illustration, which lines 12 and numerals 16 are employed to indicate degrees of drift to the left or right of the center line 18 designated as the 0° drift line. Line 18 (0° drift line) is positioned on the longitudinaal axis of the slide member 10.

The arcs 14 are provided at evenly spaced intervals along the front surface of the slide member 10 and are perpendicular at the respective points of intersection with each of the radial lines 12. The arcs 14 are numbered (in increasing increments of 10 for purposes of illustration) from 30 to 300 to graphically represent speed arcs.

A top member, indicated generally at 20, is mounted for translatory movement along the rectangular slide member 10. The slide member 10 is slidably positioned with respect to the top member 20 by slidable insertion into a groove 22 (FIG. 2) which groove 22 is formed between the laterally spaced front and back members, 24 and 26, respectively of the top member 20. The central axis of the member 20 is positioned such that it moves along the 0° drift line 18 when the top member 20 is moved along the slide 10.

The front member 24, at its top, is provided with a variation or drift scale 32 which has identifying numerals 34 thereon at 10° intervals, on each side of an index 30, to provide a convenient reference for drift to the right or left.

The inner edges 36 and 38 of the front member 24 are arcuate so as to circumscribe a circle within which is mounted a rotatable compass rose member 40 having an upper member 42 upon which the compass rose calibrations, generally indicated by the reference numerals 44, are printed and a lower spacer member 46 which is fixedly secured to the upper member 42 by fastener means, such as the threaded screws 48. The spacer member 46 is substantially larger in diameter than the upper member 42 of the compass rose member 40 so as to provide a protruding edge 47 which is slidingly engaged within an annular groove 50 (FIG. 2) formed by a spacer member 52 offset from and fixedly secured beneath the front member 24 by fastener means, such as the threaded screws 54. The spacer member 52 is preferable just slightly larger in thickness, approximately a few thousandths of an inch, than the spacer member 46 so that the compass rose 40 may be freely rotated within the groove 50.

The mating edges of the upper member 42 and the spacer member 46 are correspondingly notched so as to provide an annular grove 56 about the interior periphery of these two members. Rotatably secured within the annular groove 56, is a flat circular disc 58 which functions as a cursor, in a manner more fully described hereinafter. The disc 58 is of a transparent material and, as may be best seen in FIG. 6, has two parallel slots 60 and 62 formed therein on opposite sides of and equal distance from a cursor line 64 which extends across one diameter of the disc 58, through its axis 66. A second cursor line 65 extends across another diameter of the disc 58, through the axis 66 and perpendicular to the cursor line 64. The disc or cursor 58 is also provided with a series of markings 68 in a decreasing series from the central axis 66 to one periphery thereof, which markings graphically represent wind speed. The series of markings 68 comprise two scales which are inverted with respect to one another and are positioned between the pair of slots 60 and 62, on opposite sides of the cursor line 64. The cursor line 64 also has a pair of arrow heads 70 which, in a manner explained more fully hereinafter, indicate the wind direction and facilitates computation in that error is less likely to occur as a result of the pilot-navigator positioning the disc or cursor 58 180° from its correct position.

A cursor slide 72 is slidably mounted atop the disc or cursor 58, by means fastener means 74, which may be for example, rivets or a nut and bolt assembly, passed through apertures (not shown) formed in the cursor slide 72 and fixedly and slidably engaged within the parallel slots 60 and 62. The cursor slide 72 has two marks 76 and 78 thereon on opposite sides of and equal distance from its center axis which is indicated by the tip of an arrow head 80 provided thereon. The marking 76 is provided on the cursor slide 72 on the same side of its central axis as are the markings 68 on the disc or cursor 58 so that the former is in adjustable mating relation with the latter. The marking 78 which is an X-shaped impression and the marking 76 are utilized, as hereinafter described.

The operation of the computer for the solution of navigational problems can be readily understood from the following description of its operation, in conjunction with FIG. 1.

Initially the true course, which is the path it is desired to have the aircraft travel with respect to the ground, is selected on the compass rose member 40, by rotating the same so that the corresponding calibration on the compass rose is aligned with the index 30 on the front member 24. The cursor slide 72 is then moved along the disc or cursor 58, in the path defined by the pair parallel slots 60 and 62, until the mark 76 coincides exactly with the wind speed, as given in the weather bulletins. The disc or cursor 58 is then rotated and positioned, with respect to the compass rose member 40, such that the cursor line 64 is aligned with the corresponding calibration on the compass rose, and in the direction from which the weather bulletin indicates the wind is blowing, by aligning the cursor line 64 with the corresponding calibration and with the arrow heads 70 pointing in that direction. The top member 20 is then moved along the slide 10 until the marking 78 on the cursor slide 72 lies on the true or corrected air speed arc (the true speed being the indicated air speed corrected for temperature and pressure) on the face of the slide 10. The position of the mark 78 then indicates the drift correction angle of the aircraft, the drift correction angles being represented, as indicated above, by the radial lines 12 and identifying numeral 16. The ground speed is then read under the central axis (which is the intersection of the cursor lines 64 and 65) of the disc or cursor 58, on slide 10 at the intersection of line 18 and the speed arc 14.

The chief advantage of the computer of the present invention over those currently employed in navigation is the rapidity and simplicity of the calculations. It will be noted that it is no longer necessary, for example, to index the compass rose twice; once to plot the wind vector and a second time to index the true course. The prior art computers, in addition to requiring the indexing of the compass rose twice (with the added probability of introducing an error) required that the wind vector be plotted and identified by a pencil mark or some other separate marking means. This, of course, required the pilot-navigator to use both hands while making the navigational computations for true heading and ground speed. The resultant inattention to the guidance of the aircraft while solving the numerous navigational problems gave rise to a hazardous and generally unsatisfactory solution. The present invention, however provides a navigational computer that may conveniently be operated with one hand for the solution of navigational problems of the type illustrated and thus the pilot-navigator may still give adequate attention to control of the aircraft at all times.

The chief advantage of the computer of the present invention over the aforesaid computer disclosed in U.S. Patent 3,131,858 is in the ability to read more clearly the above mentioned particular points of reference and the fact that the cursor and slider assembly is less susceptible to breakage. The first mentioned advantage stems from the fact that markings on the slider 72 are in closer proximity to the rectangular slide member 10, hence erroneous readings due to parallax readings is substantially avoided. The ground speed of the aircraft is also more easily read since this speed is now indicated at the point of intersection of the cursor lines 64 and 65, on slide 10 at the intersection of line 18 and the speed arc 14, rather than having to view the same through the center of the rivet normally used to secure the cursor and slider assembly to the top member 20. The particular points of refrence and the ground speed can therefore all be more accurately determined and, correspondingly, more accurate computations can be made with the computer of the present invention. The second mentioned advantage results from the fact that he slider 72 is fixedly secured to the disc or cursor 58 by means of four fasteners 74, rather than by means of a centrally positioned rivet or the like, and further is in close proximity to, in fact, flush against, the face of the disc or cursor 58, rather than being a substantial distance above the face of the compass rose disc.

In FIGS. 4 and 7 there is illustrated a cursor slider assembly 82 having a top member 84 and a substantially larger bottom member 86 which are fixedly secured to one another and on opposite sides of the disc or cursor 58, in slidable relation therewith, by means of fastener means 88 passed through apertures 90 formed in each of the two members and the two parallel slots 60 and 62 formed in the disc or cursor 58. The lower member 86 has marks 91 and 92 formed thereon which correspond to, and function in the same manner as the marks 76 and 78 on the slider 72. The advantage of the cursor slider assembly 82 is in the fact that the lower member 86 having the markings 91 and 92 thereon is in still closer proximity to the rectangular slide member 10 than the cursor slider 72, so that errors due to parallax readings is even less likely than with the slider 72.

In FIGS. 8 and 9 there is shown a cursor and slide assembly constructed in accordance with still another embodiment of the invention. The cursor of this embodiment comprises a disc 94 having two parallel slots 96 and 98 formed therein, on opposite sides of and equal distance from a cursor line 100, which extend inwardly and across the face of the disc 94 from its one edge. The disc 94 likewise has markings 102 thereon representing wind speed, as the markings 68 on the disc or cursor 58 of FIGS. 1 and 6.

The cursor slider 104, is fabricated from a single piece of material and has a top member 106 from which side walls 108 and 109 depend, the ends of the latter being bent angularly inward towards one another so as to provide two parallel slots 110 and 111. The slots 110 and 111 substantially correspond in size with the thickness of the disc 94 so that the cursor slider 104 can be secured to, and slidable on, the disc or cursor 94, by simply sliding the cursor slider 104 onto the cursor or disc 94 with the side walls 108 and 109 engaged within the slots 96 and 98. The cursor slider 104 is fixedly secured to the disc or cursor 94, when the latter is rotatably engaged within the annular groove 56 formed in the mating surfaces of the upper member 40 and the spacer member 46. The cursor slider 104 also has markings of the same type as previously indicated in the case of the cursor sliders 72 and 82.

It is readily apparent that the disc or cursor 94 also can be used in combination with the cursor sliders 72 and 82. In such cases, the fastening means 74 or 88 are secured to the respective sliders 72 and 82, with the heads thereof formed in spaced relation, prior to assembling the sliders on the disc, and the sliders are then merely slipped onto the disc, as in the case of the cursor slider 104.

The slots 96 and 98 formed in the disc or cursor 94 need not extend to its peripheral edge, as shown, if the cursor slider 104 is constructed or fabricated from material which would permit the same to be snap-fitted into these grooves. However, to provide a more sturdy construction and to also facilitate assembly, it is preferred that the slots 96 and 98 be extended to the peripheral edge of the disc or cursor 94, and the slider assembled thereon, in the manner described.

It is also apparent that the computer functions in the same manner, regardless of the particularly cursor and slider assembly used, and, in each case, accurate calculations can be easily and rapidly made. Also, it is apparent that each of the cursor and slider assemblies allow more accurate readings of the particular points of reference to be made and are of a construction which is less susceptible to damage. Furthermore, the cursor and slider assemblies of the present invention can be more easily and more rapidly assembled, hence considerable monetary savings can also be realized, which factor is of considerable importance in a competitive field, such as the aerial navigational computer field.

It will thus be seen that the objects set forth above, among those made apparent from the preceding description, are efficiently attained and, since certain changes may be made in the above construction without departing from the scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention, which, as a matter of language, might be said to fall therebetween.

Now that the invention has been described, what is claimed as new and desired to be secured by Letters Patent is:

1. A plotting and computing device for solving wind vector problems comprising: an elongated rectangular slide member having indicia consisting of a plurality of radial lines and arcs thereon and representing a portion of a polar graph; a top member positioned on said rectangular member for slidable translatory movement therealong, said top member having a scale thereon adapted graphically to represent a variation or drift to the right and left and a 360° compass rose member rotatably mounted therewith, a disc member rotatably mounted within the interior periphery of said compass rose member, said disc member having a pair of cursor lines thereon which perpendicularly intersect one another to define the axis thereof, a pair of parallel slots formed therein on opposite sides of said cursor lines and a plurality of markings thereon in series from the center thereof to its peripheral edge, said markings adapted graphically to represent wind speed; a cursor slider having a top slider member and a substantially larger lower slider member; and fastener means extending through apertures formed in said top slider member and said lower slider member and secured within said pair of parallel slots for mounting said slider members on opposite sides of said disc member and for sliding movement along said disc member, said lower slider member having a first marking adjacent one end thereof to overlie said wind speed markings on said disc member and a second marking adjacent the other end thereof, said disc member and cursor slider providing means to graphically represent the wind direction and speed.

2. A plotting and computing device for solving wind vector problem comprising: an elongated rectangular slide member having indicia consisting of a plurality of radial lines and arcs thereon and representing a portion of a polar graph; a top member positioned on said rectangular member for slidable translatory movement therealong, said top member having a compass rose member rotatably mounted therewith, said compass rose member having an annular groove formed in its interior peripheral edge, a disc member having a cursor line thereon, a pair of parallel slots formed therein on opposite sides of said cursor line and a plurality of markings thereon in series from the center thereof to its peripheral edge, said markings adapted graphically to represent wind speed; and a cursor slider having means secured within said pair of parallel slots for mounting said slider for sliding movement along said disc member, said cursor slider having a first marking adjacent one end thereof to overlie said wind speed markings on said disc member and a second marking adjacent the other end thereof, said disc member and cursor slider providing means to graphically represent the wind direction and speed, said disc member being rotatably secured within said annular groove formed in the peripheral edge of said compass rose member with said cursor slider lying in substantially the same plane formed by the top surface of said compass rose member.

3. A plotting and computing device, as claimed in claim 2 further including fastener means extending through apertures formed in said slider and secured within said pair of parallel slots for mounting said slider atop said disc member in flush engagement therewith and for sliding movement along said disc member.

4. A plotting and computing device, as claimed in claim 2, wherein said cursor slider comprises a top slider member and a substantially larger lower slider member and fastener means extending through apertures formed in said top slider member and said lower slider member and secured within said pair of parallel slots for mounting said slider members on opposite sides of said disc member and for sliding movement along said disc member, said lower slider member having a first marking adjacent one end thereof to overlie said wind speed markings on said disc member and a second marking adjacent the other end thereof, said disc member and cursor slider providing means to graphically represent the wind direction and speed.

5. A plotting and computing device, as claimed in claim 2, wherein said pair of parallel slots formed in said disc member extend inwardly from its peripheral edge and wherein said cursor slider comprises a top member with side walls depending therefrom which are angled toward one another so as to form a groove adapted to receive said disc member for mounting said slider with its side walls secured within said pair of parallel slots for sliding movement along said disc member, said cursor slider having a first marking adjacent one end thereof to overlie said wind speed markings on said disc member and a second marking adjacent the other end thereof, said disc member and cursor slider providing means to graphically represent the wind direction and speed.

6. A plotting and computing device for solving wind vector problems comprising: an elongated rectangular slide member having indicia consisting of a plurality of radial lines and arcs thereon and representing a portion of a polar graph; a top member positioned on said rectanular member for slidable translatory movement therealong, said top member having a compass rose member rotatably mounted therewith, said compass rose member having an annular groove formed in its interior peripheral edge, a disc member having a cursor line thereon, a pair of parallel slots formed therein on opposite sides of said cursor line and a plurality of markings thereon in decreasing series from the center thereof to its peripheral edge, said markings adapted graphically to represent wind speed; and a cursor slider having means secured within said pair of parallel slots for mounting said slider for sliding movement along said disc member, said cursor slider having a first marking adjacent one end thereof to overlie said wind speed markings on said disc member and a second marking adjacent the other end thereof, said disc member and cursor slider providing means to graphically represent the wind direction and speed, said disc member being rotatably secured within said annular groove formed in the peripheral edge of said compass rose member, said disc member and said cursor slider each having a thickness such that the total thickness of said disc member and said cursor slider is less than the thickness of said compass rose member.

7. A plotting and computing device for solving wind vector problems comprising: an elongated rectangular slide member having indicia consisting of a plurality of radial lines and arcs thereon and representing a portion of a polar graph; a top member positioned on said rectangular member for slidable translatory movement therealong, a compass rose member having an extending lip about its exterior edge, said top member having an annular ledge formed thereon which is adapted to overlap said extending lip so as to retain said compass rose member in rotatable relationship therewith, a disc member having a cursor line thereon, a pair of parallel slots formed therein on opposite sides of said cursor line and a plurality of markings thereon in decreasing series from the center thereof to its peripheral edge, said markings adapted graphically to represent wind speed; and a cursor slider having means secured within said pair of parallel slots for mounting said slider for sliding movement along said disc member, said cursor slider having a first marking adjacent one end thereof to overlie said wind speed markings on said disc member and a second marking adjacent the other end thereof, said disc member and cursor slider providing means to graphically represent the wind direction and speed, said compass rose member having an annular groove formed in its interior peripheral edge and said disc member being rotatably secured therein, said disc member and said cursor slider each having a thickness such that the total thickness of said disc member and said cursor slider is less than the thickness of said compass rose member.

References Cited by the Examiner

UNITED STATES PATENTS

| | | | |
|---|---|---|---|
| 1,181,672 | 5/1916 | Reuffel | 235—70.2 |
| 2,953,298 | 9/1960 | Peterkin | 235—78 |
| 3,131,858 | 5/1964 | Warner | 235—61 |

LEO SMILOW, *Primary Examiner.*